DRIVER FOR BIPOLAR CAPACITIVE LOADS

Filed May 26, 1967

INVENTOR.
PAUL S. GRONER
BY William J. Simmons Jr.
ATTORNEY

United States Patent Office 3,519,851

Patented July 7, 1970

3,519,851

DRIVER FOR BIPOLAR CAPACITIVE LOADS

Paul Stephen Groner, Santa Ana, Calif., assignor to Corning Glass Works, Corning, N.Y., a corporation of New York Filed May 26, 1967, Ser. No. 641,599
Int. Cl. H03k *5/08*
U.S. Cl. 307—237 10 Claims

ABSTRACT OF THE DISCLOSURE

A bipolar driver circuit is disclosed for a capacitive load such as a delay line. The driver circuit causes current to flow in either direction through the two input terminals of the capacitive load depending on whether the load is being driven with a logic "1" pulse or a logic "0" pulse. Between logic pulses, a voltage which accumulates across the capacitive load is discharged by a diode network which is connected to the two input terminals of the capacitive load.

BACKGROUND OF THE INVENTION

When current is driven through a capacitive load, a voltage may accumulate across the input terminals of the load and give rise to such disadvantages as waveform distortion and decreased speed of operation. The accumulated charge must be rapidly dissipated to overcome these disadvantages. A prior attempt at dissipating the accumulated charge involved the connection of a low ohm resistor between the two input terminals of the capacitive load. Although the accumulated voltage across the load discharged through the resistance, the result was an inefficient drive, a large amount of power being dissipated in the resistor. A resistor which adequately discharged the voltage across the load effectively reduced the drive by a factor of about eight.

It is accordingly an object of this invention to provide a driver circuit for a capacitive load having increased efficiency, improved output waveform and increased speed of operation.

Another object of this invention is to provide means for rapidly discharging an undesirable voltage which accumulates across the input terminals of a capacitive load between driving pulses.

A further object of this invention is to provide an improved bipolar delay line driver.

This invention generally relates to a bipolar driver for a capacitive load having two input terminals. The driver is adapted to introduce current pulses through the input terminals in either direction depending on whether a logic "1" or a logic "0" pulse is being delivered to the load. A charge which accumulates at the input terminals between current pulses raises the potential of one of the two terminals to an undesirable level which biases the driver in such a manner as to prevent the rapid discharge of the accumulated charge. The improvement according to this invention comprises the addition of clamping means connected to the capacitive load input terminals to clamp the terminals to a potential which is lower than the undesirable potential level.

Additional objects, features and advantages of the present invention will become apparent, to those skilled in the art, from the following detailed description and the attached drawing, on which, by way of example, only the preferred embodiment of this invention is illustrated.

DETAILED DESCRIPTION

Figure 1:
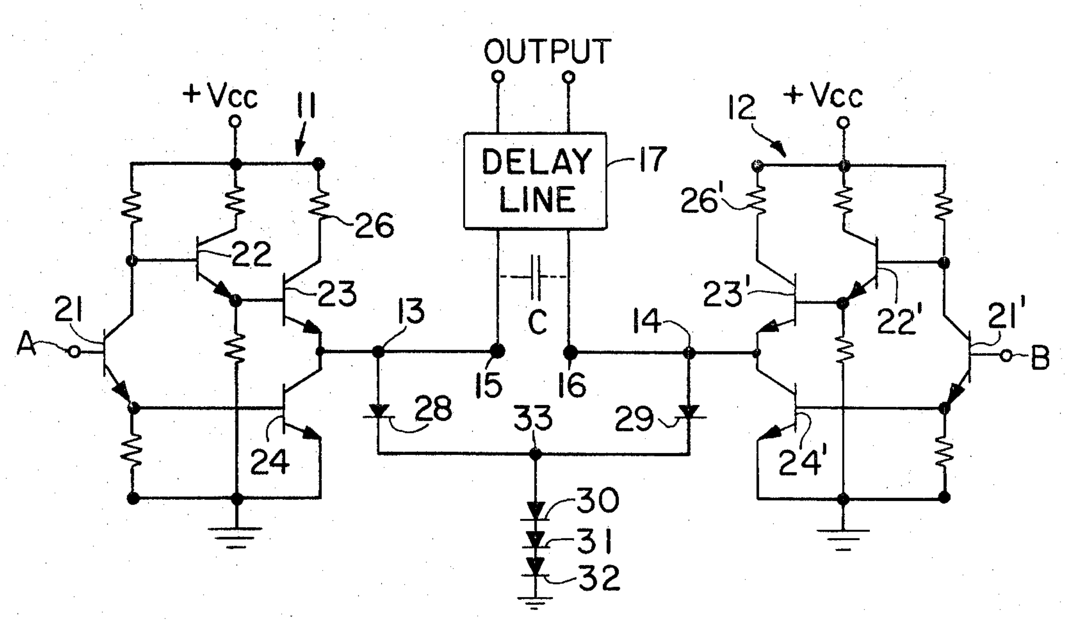
FIG. 1 is a schematic diagram of a bipolar delay line driver.

FIG. 1 shows a schematic circuit diagram of a transistorized driver for a bipolar delay line. Two identical driver circuits 11 and 12 have their output terminals 13 and 14 connected to the two input terminals 15 and 16, respectively, of a delay line 17. The delay line 17 is intended to be illustrative of any capacitive load including a piezo electric transducer and various types of delay lines including lumped parameter, ultrasonic and the like. The effective input capacitance of the delay line is illustrated by a capacitor C connected between the two input terminals 15 and 16.

Since the driver circuits 11 and 12 are identical, only the circuit 11 is described, and the identical components of the circuit 12 are illustrated with primed reference numerals. An input transistor 21 has its collector connected to the base of an emitter follower transistor 22. The emitter of the transistor 22 is connected to the base of the transistor 23, and the emitter of the transistor 21 is connected to the base of the transistor 24. A resistor 26 is connected between the voltage supply $V_{cc}$ and the collector of the transistor 23. An input terminal A is connected to the base of the transistor 21 while an input terminal B is connected to the base of the transistor 21'. A pair of diodes 28 and 29 have their anodes connected to the terminals 13 and 14, respectively, their cathodes being connected to a terminal 33. Diodes 30, 31 and 32 are connected in series between the terminal 33 and a source of reference potential.

The bias network for the driver circuits 11 and 12 is such that the transistors 21 and 24 are normally non-conducting while the transistors 22 and 23 are normally conducting. A positive pulse at the input terminal A causes transistor 21 to conduct, and the voltage appearing at the emitter thereof causes the transistor 24 to conduct. However, the reduced voltage at the collector of the transistor 21 turns off the transistor 22, and the voltage at the emitter thereof turns off the transistor 23.

The operation of the circuit of FIG. 1 absent the diodes 28 through 32 will first be described. With no input at the terminal A, the output terminal 13 of the driver 11 is at a high positive voltage which approaches $V_{cc}$. A positive pulse appearing at the terminal A causes the voltage at the terminal 13 to drop to near reference potential. Similarly, with no input to the terminal B of the driver 12, the output terminal 14 is at a high positive voltage, but the voltage at the terminal 14 drops to near reference potential when a positive pulse is applied to the terminal B.

Figure 2:
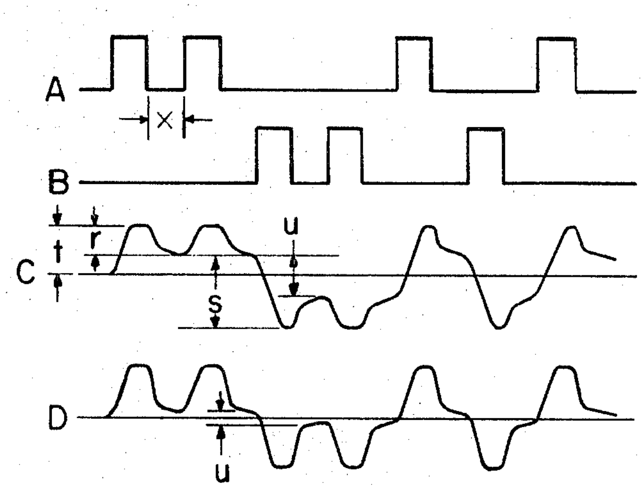
FIG. 2 is a diagram of the waveforms which appear at various terminals in the circuit shown in FIG. 1.

FIG. 2 illustrates the waveforms which exist at specified points in FIG. 1. FIG. 2A is the waveform that is applied to the input terminal A of the driver 11 and FIG. 2B is the waveform which is applied to the input terminal B of the driver 12. FIG. 2C is the waveform that appears at the input terminal 15 and 16 of the delay line 17 without the diodes 28 through 32, and the waveform appearing at the terminals 15 and 16 with the discharge circuit of this invention added to the driver circuits is shown in FIG. 2D.

The delay line 17 is driven by bipolar logic in the following manner. A positive pulse appearing at input terminal A represents a logic "1," and a logic "0" is represented by a positive pulse at the input terminal B. Thus, in order to drive the delay line with a series of "1's" and and "0's," positive pulses appear at either terminal A or terminal B depending upon whether a logic "1" or logic "0" is being transmitted. Between logic pulses transistors 23 and 23' are on while the transistors 24 and 24' are off. Therefore, the delay line terminals 15 and 16 are both at a high positive potential. If a logic "1" pulse appears at the terminal A, the transistor 23 turns off and transistor 24 turns on. Therefore, the voltage at terminal 15 drops to reference potential. Since the transistor 23′ remains on and the transistor 24′ remains off during a logic "1" pulse, the terminal 16 remains unchanged at a high positive potential. At the termination of the logic "1" pulse, the transistors 23 and 24 return to their initial states of conduction, and the terminal 13 again becomes positive. However, the effective capacitance C which appears across the delay line input terminals 15 and 16 remains charged to nearly $V_{cc}$, the voltage to which it was charged during the logic "1" pulse, the terminal 16 being positive with respect to the terminal 15. The only available path for this capacitance to discharge during the time between logic pulses is through the transistors 23 and 23′ and the resistors 26 and 26′ to the source $V_{cc}$. Since the emitter voltage of the transistor 23′ is at a potential which is about equal to the voltage $V_{cc}$ plus the voltage across the capacitance C, the transistor 23′ may be considered to be "back voltaged." The collector to emitter voltage of the transistor 23′ is such that the capacitance C cannot discharge quickly through this transistor to the voltage supply $V_{cc}$. As shown in FIG. 2A, during the time $x$ between the first logic "1" pulse and the second logic "1" pulse, the current flowing through the input terminals of the delay line cannot decay nearly to zero before the initiation of the second logic "1" pulse, as shown by FIG. 2C. A series of sequential "1's" or "0's" creates an effective amplitude $r$ as shown in FIG. 2C rather than a possibly attainable amplitude $t$. A series of alternate "1's" and "0's" creates an effective amplitude $s$ between opposite types of logic pulses, but the amplitude $s$ appears only on the leading edge of alternate types of pulses. The result is an amplitude variation of the delay line output signal depending on the data sequence. Other adverse effects of the failure of the capacitance C to rapidly discharge are a lowered effective drive amplitude and distortion of the output waveform.

In accordance with this invention the diodes 28 through 32 are connected to the delay line input termials 15 and 16 to increase the discharge rate of the capacitance C. The diodes 28 and 29 clamp the terminals 13 and 14, respectively to the voltage appearing at the terminal 33 plus the forward voltage drop across the diodes 28 and 29. Since the voltage at either or both of the terminals 13 and 14 tends to approach $V_{cc}$ without the diode network, the diode 28 and/or the diode 29 and the diodes 30, 31 and 32 will conduct. Since the iodes 30, 31 and 32 continually conduct, the voltage at the terminal 33 will always be the sum of the forward voltage drops of these diodes. In practice, it has been found desirable to maintain the terminal 33 at about +3 volts. It is obvious that the diodes 30, 31 and 32 can be replaced by a voltage source, a resistor, or any other well known biasing means. It is noted, however, that a resistor will require more current than the diodes 30, 31 and 32.

The effect of the diode clamping network on the operation of the driver circuit of FIG. 1 will now be described. In the absence of logic pulses the terminal 13 and 14 will both tend to approach the source voltage $V_{cc}$. However, since all of the diodes 28 through 32 are forward biased, they will conduct and drop the voltage at terminals 13 and 14 to about +4 volts, the sum of the forward voltage drops of four diodes. A logic "1" pulse appearing at terminal A causes the voltage at terminal 13 to approach reference potential. Since terminal 14 remains positive, current begins to flow from the terminal 16 to the terminal 15 of the delay line, charging the capacitance C. At the termination of the logic "1" pulse the terminal 13 again becomes about 4 volts positive, the clamping voltage. However, as the terminal 16 attempts to become more positive due to the addition of the voltage to which the capacitance C was charged to the voltage at the terminal 16, the diodes 29 through 32 clamp the terminal 14 to about +4 volts. The capacitance C discharges through the diode 29 or the diode 28, and the diodes 30, 31 and 32, depending on whether a logic "1" or a logic "0" had previously been delivered to the delay line. In practice, it was found that the voltage across the capacitance C discharges rapidly enough that the delay line 17 can be driven at more than eight megabits per second, in the bipolar return to zero mode.

As shown in FIG. 2D the effective drive to the delay line is increased by the addition of the diodes 28 to 32 to the driver circuit. It is noted that there is a significant reduction in the D.C. offset voltage $u$ in FIG. 2D as compared with that of FIG. 2C due to the rapid discharge of the delay line capacitance between logic pulses.

Although the present invention has been described with respect to specific details of certain embodiments thereof, it is not intended that such details be limitations upon the scope of the invention except insofar as set forth in the following claims.

What is claimed is:

1. In a bipolar driver for a capacitive load having first and second input terminals and at least two output terminals, a capacitance appearing between said first and second input terminals, wherein said driver comprises first and second amplifiers each having an output terminal, the output terminals of said first and second amplifiers being respectively connected to said first and second capactive load input terminals, said driver being adapted to introduce current pulses through said first and second capactive load input terminals in either of two directions, and wherein a charge which accumulates at said input terminals between said current pulses can raise the potential of either one of said terminals to an undesirable level which biases said driver in such a manner as to prevent the rapid discharge of said accumulated charge, the improvement comprising clamping means connected to both of said capacitive load input terminals to clamp said terminals to a potential which is lower than said undesirable potential level, said clamping means providing a discharge path for the undesirable level of voltage which tends to accumulate across said capacitive load.

2. A bipolar driver in accordance with claim 1 wherein said clamping means comprises unilateral conduction means connected to said capacitive load input terminals and means connected to said last mentioned means for biasing said unilateral conduction means at a level which is lower than said undesirable potential level.

3. A bipolar driver in accordance with claim 2 wherein said unilateral conduction means comprises a first diode having one terminal thereof connected to said first capactive load input terminal and a second diode having one terminal thereof connected to said second capacitive load input teminal, the remaining terminals of said first and second diodes being connected to said biasing means.

4. A bipolar driver in accordance with claim 3 wherein said biasing means comprises a source of reference potential and a plurality of diodes connected in series between said remaining terminals of said first and second diodes and said source of reference potential.

5. A bipolar driver in accordance with claim 1 wherein said capacitive load is a delay line.

6. A bipolar driver for a capacitive load having first and second input terminals and at least a pair of output terminals, a capacitance appearing between said first and second capacitive load input terminals, said driver comprising first and second driver circuits each having an output terminal which is respectively connected to said first and second capacitive load input terminals, first input means to apply logic "1" pulses to said first driver circuit, second input means to apply logic "0" pulses to said second driver circuit, said logic "1" and said logic "0" pulses never occurring concurrently, the voltage at said first and second driver circuit output terminals being at a first level between logic pulses, the voltage at said first driver circuit output terminal changing to a second level which is lower than said first level when a logic "1" pulse is applied to said first input means, and the voltage at said second driver circuit output terminal changing to said second level when a logic "0" pulse is applied to said second input means, and clamping means connected to said capacitive load input terminals to prevent said terminals from assuming a voltage that is beyond said first voltage level in a direction proceeding from said second to said first voltage level, said clamping means providing a discharge path for said capacitance when said capacitance tends to charge to undesirable voltage levels.

7. A driver in accordance with claim 6 wherein said capacitive load is a delay line.

8. A driver in accordance with claim 7 wherein said clamping means comprises a first diode having one terminal thereof connected to said first capacitive load input terminal and a second diode having one terminal thereof connected to said second capacitive load input terminal, and biasing means connected to the remaining terminals of said first and said second diodes.

9. A driver in accordance with claim 8 wherein said biasing means comprises a plurality of diodes connected in series between the remaining terminals of said first and second diodes and a source of reference potential.

10. A bipolar driver in accordance with claim 9 wherein said first and second driver circuits each comprise first, second, third and fourth transistors, said input means being connected to the base electrode of said first transistor, the collector electrode of said first transistor being connected to the base electrode of said second transistor, the emitter electrodes of said first and said second transistors being connected to the base electrodes of said fourth and said third transistors, respectively, said output terminals being connected to the emitter electrode of said third transistor, and mean for biasing said transistors so that said first and fourth transistors are normally non-conducting in the absence of logic pulses and said second and third transistors are normally conducting in the absence of logic pulses.

References Cited

UNITED STATES PATENTS

| | | | |
|---|---|---|---|
| 2,975,371 | 3/1961 | Greanias | 328—127 X |
| 3,125,694 | 3/1964 | Palthe | 307—237 X |
| 3,170,038 | 2/1965 | Johnson et al. | 307—208 X |
| 3,300,772 | 1/1967 | Vinal | 307—237 X |
| 3,302,035 | 1/1967 | Greene | 307—241 |

DONALD D. FORRER, Primary Examiner

S. D. MILLER, Assistant Examiner

U.S. Cl. X.R.

307—270, 246, 268, 293, 208; 328—65, 67, 162